(12) United States Patent
Haiderzaidi et al.

(10) Patent No.: US 10,678,572 B2
(45) Date of Patent: *Jun. 9, 2020

(54) FRAMEWORK FOR AUTOMATED GLOBALIZATION ENABLEMENT ON DEVELOPMENT OPERATIONS

(71) Applicant: International Business Machines Corporation, Armonk, NY (US)

(72) Inventors: Syed Haiderzaidi, Austin, TX (US); Su Liu, Austin, TX (US); Boyi Tzen, Taipei (TW); Cheng Xu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/413,651

(22) Filed: Jan. 24, 2017

(65) Prior Publication Data

US 2017/0371764 A1    Dec. 28, 2017

Related U.S. Application Data

(63) Continuation of application No. 15/195,457, filed on Jun. 28, 2016.

(51) Int. Cl.
*G06F 11/36* (2006.01)
*G06F 9/451* (2018.01)

(52) U.S. Cl.
CPC .......... *G06F 9/454* (2018.02); *G06F 11/3612* (2013.01)

(58) Field of Classification Search
CPC .................... G06F 11/3604; G06F 11/3612
USPC ........................................................ 717/126
See application file for complete search history.

(56) References Cited

U.S. PATENT DOCUMENTS

| 5,485,409 A | 1/1996 | Gupta et al. |
|---|---|---|
| 7,103,875 B1 | 9/2006 | Kaneko et al. |
| 7,698,688 B2 | 4/2010 | Fujiwara et al. |
| 7,752,501 B2 | 7/2010 | Bak |
| 7,793,156 B2 | 9/2010 | Tsurumi et al. |
| 7,925,659 B2 | 4/2011 | Wefers et al. |
| 8,302,087 B2 | 10/2012 | Ayachitula et al. |

(Continued)

FOREIGN PATENT DOCUMENTS

CN        103777944 A      5/2014

OTHER PUBLICATIONS

IBM, List of IBM Patents or Patent Applications Treated As Related for U.S. Appl. No. 15/413,641, filed May 31, 2018.

(Continued)

*Primary Examiner* — Chat C Do
*Assistant Examiner* — Bradford F Wheaton
(74) *Attorney, Agent, or Firm* — Patterson + Sheridan, LLP (57) ABSTRACT

Techniques provide a framework for dynamic globalization enablement for an application during software development. A globalization development operation information system (GDOIS) retrieves source code for the application, which is assigned to support specified globalization features. The GDOIS evaluates the source code for each of the plurality of specified globalization features. Upon determining that the source code does not include at least a first specified globalization feature, the GDOIS identifies an application programming interface (API) associated with the feature. The GDOIS inserts source code associated with the API into the source code for the application.

7 Claims, 6 Drawing Sheets

(56) References Cited

U.S. PATENT DOCUMENTS

| | | |
|---|---|---|
| 8,468,492 B1 | 6/2013 | Frenkel |
| 8,615,732 B2 | 12/2013 | Kaneko et al. |
| 8,769,404 B2 | 7/2014 | Atkin et al. |
| 8,924,934 B2 | 12/2014 | Sullivan et al. |
| 9,300,727 B2 | 3/2016 | Ongg et al. |
| 2005/0137845 A1 | 6/2005 | Carroll et al. |
| 2006/0100858 A1* | 5/2006 | McEntee ............ G06F 17/2247 704/10 |
| 2007/0050427 A1 | 3/2007 | Atkin et al. |
| 2007/0089085 A1 | 4/2007 | Atkin et al. |
| 2008/0127045 A1* | 5/2008 | Pratt ...................... G06F 9/454 717/104 |
| 2008/0127103 A1* | 5/2008 | Bak ...................... G06F 9/4443 717/126 |
| 2008/0196101 A1 | 8/2008 | Sade et al. |
| 2009/0037830 A1* | 2/2009 | Kulkarni ............... G06F 9/454 715/764 |
| 2009/0094609 A1* | 4/2009 | Burukhin ............... G06F 9/454 718/104 |
| 2009/0118881 A1* | 5/2009 | West ..................... B60W 10/08 701/22 |
| 2011/0276939 A1 | 11/2011 | Frankin et al. |
| 2013/0007588 A1* | 1/2013 | Guo .................... G06F 11/3688 715/234 |
| 2013/0104100 A1* | 4/2013 | Mueller .................. G06F 9/44 717/106 |
| 2013/0226555 A1* | 8/2013 | Lerum .................. G06F 9/454 704/2 |
| 2013/0227522 A1 | 8/2013 | Lerum et al. |
| 2015/0262079 A1 | 9/2015 | Livshits et al. |
| 2016/0321243 A1* | 11/2016 | Walia .................. G06F 17/271 |
| 2017/0123634 A1* | 5/2017 | Pai ...................... G06F 3/04842 |
| 2017/0371630 A1 | 12/2017 | Haiderzaidi et al. |
| 2017/0371631 A1 | 12/2017 | Haiderzaidi et al. |
| 2017/0371687 A1 | 12/2017 | Haiderzaidi et al. |
| 2017/0371762 A1 | 12/2017 | Haiderzaidi et al. |
| 2017/0371763 A1 | 12/2017 | Haiderzaidi et al. |

OTHER PUBLICATIONS

Database Globalization Support Guide, (Online] Available: http:I/docs_oracle_com/cd/B19306_01/server_ 102/b14225/ chh8gdk_ htm [Accessed Apr. 21, 2016].

* cited by examiner

```
public class Example {
    public static void main(String[] args) {

System.out.println("Hello world!");
        System.out.println("What a wonderful place!");
        System.out.println("See you in space!");
```
505

```
public class HardCodedStrings {
    public static void main(String[] args) {

System.out.println(Messages.getString("Example.str01"));  //$NON-NLS-1$
        System.out.println(Messages.getString("Example.str02"));  //$NON-NLS-1$
        System.out.println(Messages.getString("Example.str03"));  //$NON-NLS-1$
```
510

515

| Value | Key |
|---|---|
| Hello World! | Example.str01 |
| What a wonderful place! | Example.str02 |
| See you in space! | Example.str03 |

FRAMEWORK FOR AUTOMATED GLOBALIZATION ENABLEMENT ON DEVELOPMENT OPERATIONS

BACKGROUND

The present disclosure relates to software development, and more specifically, to providing a framework for dynamic globalization enablement in a software development environment.

Globalization enablement relates to adapting computer software to conform to requirements of a given locale. The requirements may include adherence to languages and cultural conventions, such as code sets, character classifications, character comparison rules, character collation order, monetary formatting, numeric punctuation, date and time formatting, and the like. Many businesses that provide applications to international markets use some form of globalization enablement to adapt the applications for those markets. Applications that include globalization functionality typically invoke application programming interface (API) methods at initialization to localize the application to be specific to a target region, e.g., such that the language is set to that of the users of the region, numbering conventions adhere to that of the region, currency symbols are set to that of the region, etc.

Including globalization features in an application is typically complex. During the development phase of a given application, a developer needs to know where in the application source code to insert appropriate API calls to provide certain globalization features. For example, in some development environments, a specific sequence of API calls is necessary to insert the globalization feature into the application. In some cases, a developer may call a given API method at an ineffective location or in the wrong sequence, which may result in the globalization feature being non-functional at runtime of the application. Further, in other cases, developers may directly hard-code message string literals in a given language (e.g., English, Chinese) for user interface components (e.g., error messages, status messages, menu items), rather than calling the appropriate API methods to determine an appropriate language that a given user interface component should display.

Consequently, providing globalization enablement to a given application is prone to errors. Typically, to address such errors, the application may undergo global verification testing to ensure that such errors are identified prior to deployment. However, as many businesses adopt modern software development operation paradigms, such windows for testing have grown smaller. And as a result, the application may be deployed with globalization feature-related errors intact. Therefore, more reliable methods for globalization enablement in software development are desirable.

SUMMARY

One embodiment presented herein discloses a method for providing one or more globalization enablement features to an application. The method generally includes evaluating source code of an application for string literals hard-coded into the source code. The method also includes evaluating the source code of the application based on one or more globalization enablement requirements. The analyzer identifies portions in the source code of the application that are not compliant with at least one of the globalization enablement requirements. The method also includes inserting source code compliant with the at least one of the globalization enablement requirements to the respective identified portions in the source code of the application.

BRIEF DESCRIPTION OF THE SEVERAL VIEWS OF THE DRAWINGS

So that the manner in which the above-recited features of the present disclosure can be understood in detail, a more particular description of the disclosure, briefly summarized above, may be had by reference to the embodiments, some of which are illustrated in the appended drawings. It is to be noted, however, that the appended drawings illustrate only exemplary embodiments and are therefore not to be considered limiting of its scope, and may admit to other equally effective embodiments.

DETAILED DESCRIPTION

Embodiments presented herein disclose a framework that provides globalization enablement features and verification testing to an application. In particular, techniques provide a globalization development operation information system (GDOIS) framework that interfaces with an integrated development environment (IDE) tool, e.g., executing on a developer system. The framework assists the IDE tool in developing applications that use globalization features to adapt the application to a given region (e.g., regional language support, adherence to numerical, naming, and unit conventions of the region, and the like). Additional globalization enablement modules may be added to the framework to assist the IDE tool in analyzing a software development project and formatting the project such that the project adheres to globalization enablement standards, e.g., set by an organization.

In one embodiment, the GDOIS evaluates developer source code for an application project in real-time or check-in of the source code to a repository. The GDOIS does so to determine whether the source code conforms to globalization enablement requirements associated with the application project, such as whether application programming interface (API) method calls associated with globalization features are made in a correct sequence. For example, some software development environments require that to provide translatability functionality (e.g., to translate user interface components at runtime initialization to a language associated with a target region), the source code should first call an API method that sets the default locale for the application. Next, the source code should then call a method for opening a category descriptor, a method for retrieving a category descriptor, a call to the globalization feature method, and then a call closing the category descriptor. In this example, if a developer calls the methods in a manner that deviates from this order (or neglects to include one of the methods), the globalization feature might fail to function correctly. Further, the GDOIS may scan the developer source code to check for hard-coded string literals that correspond to some component of the application that should instead be an API call to some globalization feature (e.g., a translatability-related method). For instance, a developer might hard-code "Accept" and "Reject" buttons for a dialog box in English, where, under globalization enablement standards, the code for the corresponding "Accept" and "Reject" buttons should call an API to display the text in the language associated with a target region. Hard-coding the message string literals in this case can be problematic if the application is deployed in non-English-speaking countries.

In one embodiment, the GDOIS may detect areas in developer source code that do not comply with globalization enablement standards, such as in the examples described above. Once detected, the GDOIS may replace the non-compliant portions of the code with source code that provides the globalization feature at that location. Continuing the previous example of the "Accept" and "Reject" dialog buttons, the GDOIS may extract the text within the hard-coded message strings and place them into a text file associated with the regional language settings. The GDOIS may then remove the hard-coded message string from the source code and then replace it with a call to a globalization API method that retrieves the string from a text file associated with target regional language settings. By doing so, the application may, at runtime initialization, call the method used for the "Accept" and "Reject" buttons and display the buttons in a language appropriate to a region setting of the application.

In addition, the GDOIS verifies developer source code in real-time to ensure that developer source code complies with the specified globalization requirements associated with the application. The GDOIS may do so without having to fully compile the source code into a binary executable. Instead, the GDOIS may create a temporary build of the developer source code and execute the build in a test environment. For example, the GDOIS can execute the build under one or more test cases to check for any errors in implementing globalization enablement in the source code. Additionally, in one embodiment, the GDOIS also allows a virtual verification procedure, where the GDOIS logically verifies developer source code by determining whether the source code adheres to globalization enablement standards based on the specified requirements associated with the underlying application project. In doing so, the GDOIS may also determine whether necessary files in the application project, e.g., language files and sub-directories associated with targeted regions are present. For example, the verification might fail if a translation file associated with a given target region is missing.

Embodiments presented herein disclose techniques for dynamically enabling globalization features to an application in a software development environment. The GDOIS proactively updates and verifies developer source code to comply with predefined globalization enablement requirements, prior to a developer checking the code in to a repository or compiling the code into a binary executable. Advantageously, detecting non-compliant portions of code (e.g., hard-coded string literals in a region-specific language) and replacing those portions with globalization-enabled source code reduces the amount of globalization enablement errors in the resulting application at deployment.

In addition, the GDOIS also verifies the application that the globalization features are functioning properly, prior to check-in or to compilation, which significantly reduces the time of a development operation cycle for a given application.

Figure 1:
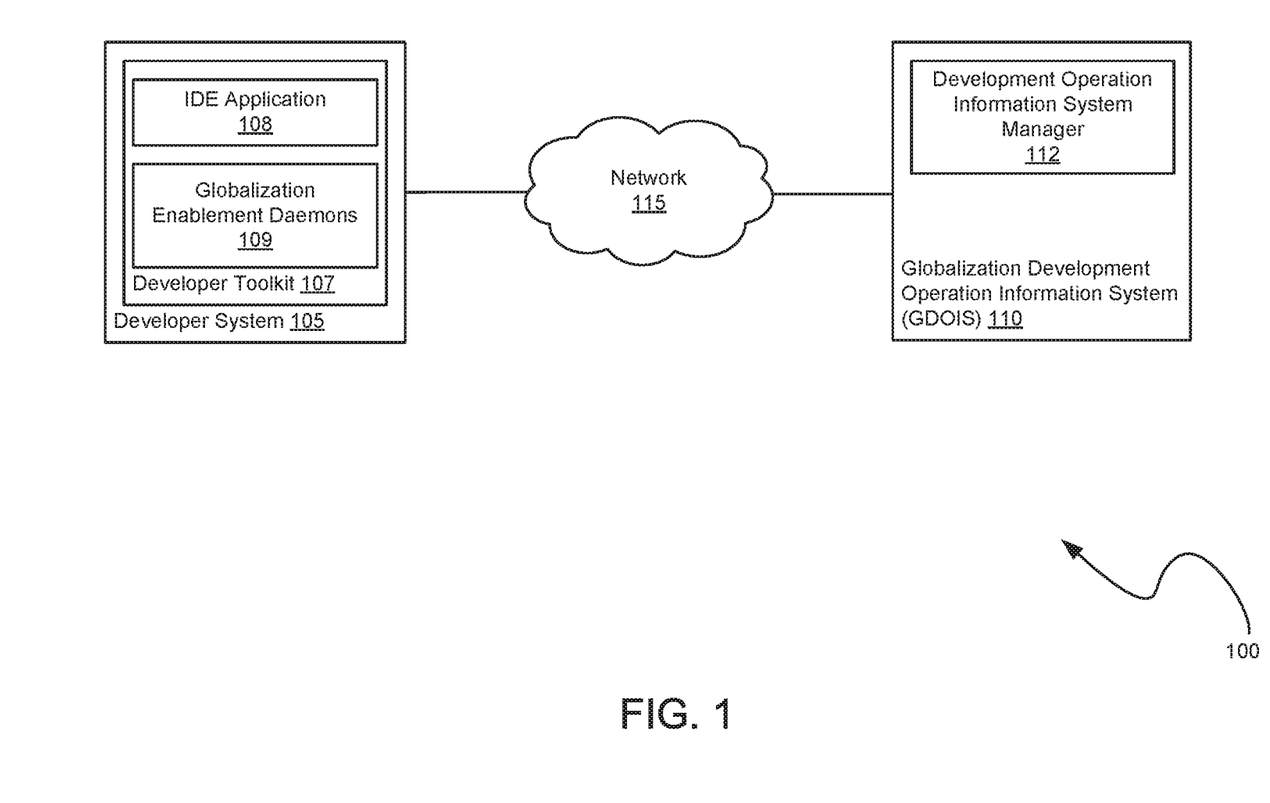
FIG. 1 illustrates an example computing environment, according to one embodiment.

FIG. 1 illustrates an example computing environment 100, according to one embodiment. As shown, computing environment 100 includes a developer system and a globalization development operation information system (GDOIS) 110, each interconnected with a network 115 (e.g., a local area network, the Internet, etc.). In one embodiment, the developer system 105 is a physical computing system (e.g., a desktop computer, laptop computer, tablet computer, etc.) or a virtual computing instance executing in a cloud. Similarly, the GDOIS 110 may be a physical computing system (e.g., residing in a data center, workstation, etc.) or a virtual computing instance executing in the cloud. In one embodiment, computing environment 100 represents a software development environment having multiple developer systems 105 creating one or more application projects.

In one embodiment, the developer system 105 includes a developer toolkit 107 which provides an integrated development environment (IDE) application 108. A user, such as a software developer for an enterprise, may create software applications via the IDE application 108. In particular, the IDE application 108 provides a user interface that allows the software developer to create or edit application projects and files that are part of or associated with those projects (e.g., application source code, user libraries, and the like). Further, the developer toolkit 107 may provide compilers to generate an executable from the application projects. In the software development environment, the developer may save updates to application source code and check-in the code to a repository (not shown) storing the application projects.

In some cases, the enterprise may impose globalization requirements on applications created in the software development environment. Such may be the case for applications that the enterprise desires to make available in different countries. In such a case, a developer will need to program a given application such that the application is adaptable to target regions.

For example, assume that a software developer designs a payment processing application that can be used in various countries, such as the United States and France. When released in France, the payment processing application should adhere to regional and cultural conventions of the country. For example, the payment processing application should display relevant text in French, currency signs in Euros, dates in Day/Month/Year format, and the like. To reduce time in adapting a United States-specific version of the payment processing application to a France-specific version (and other region-specific versions), a developer may take advantage of globalization enablement application programming interface (API) libraries.

Generally, globalization enablement APIs provide sets of methods for adapting a given application to a particular region. For example, APIs can include methods for setting and retrieving locale information, formatting a date and time to conform with a set locale, formatting a currency pattern to conform with a set locale, set and retrieve preferred language information for a set locale, insert strings for user interface components in a set preferred language, etc.

At times, however, a developer might incorrectly use (or neglect to use) globalization enablement APIs during development of an application project. For example, the developer may, instead of calling a particular globalization enablement method for a message to be displayed in a status dialog box of an application, hard-code a string literal representing the message in a native language of the developer. This may cause translatability problems when the application is deployed in other countries. For instance, if the application is eventually ported to another country (that does not use the native language of the developer), and the hard-coded string literal is not identified prior to deployment to the other country, the application will still display the hard-coded string literal in the native language of the developer.

To address issues such as these, in one embodiment, the GDOIS 110 evaluates developer source code (via globalization enablement daemons 109 provided by the developer for enablement of globalization features in real-time and/or prior to check-in of the code to the repository. As further described below, the GDOIS 110 updates the source code to comply with specified globalization enablement requirements in the event that deficiencies (e.g., such as the examples described above) are detected. Further, the GDOIS 110 performs a variety of software globalization verification tests to the application project (e.g., to the source code itself or to a temporary build of the application) in real-time or prior to check-in of the source to ensure that the application complies with specified globalization enablement requirements.

Figure 2:
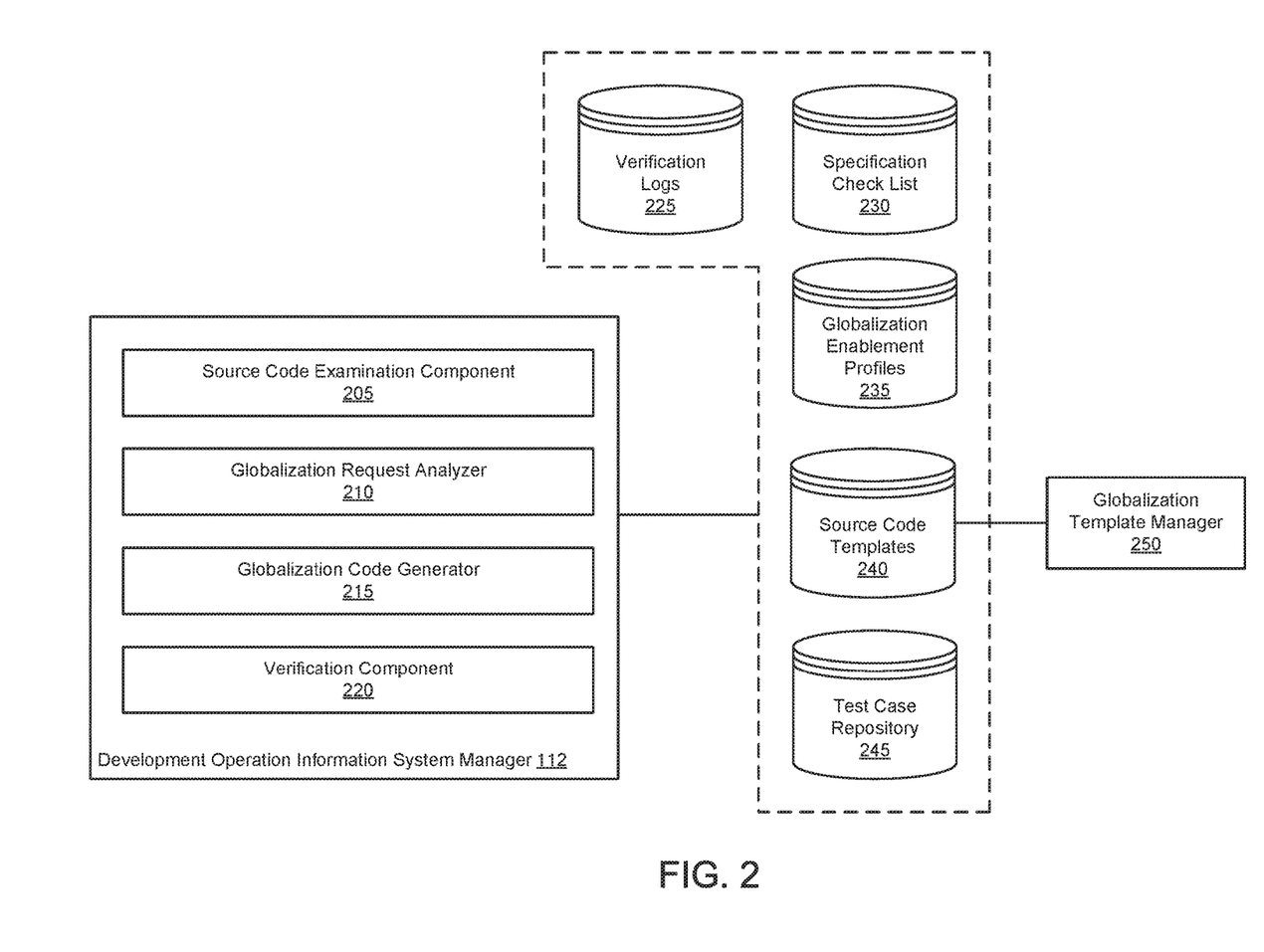
FIG. 2 further illustrates the globalization development operation information system manager described relative to FIG. 1, according to one embodiment.

To that effect, the GDOIS 110 includes a development operation information system manager 112. FIG. 2 further illustrates the development operation information system manager 112, according to one embodiment. As shown, the development operation information system manager 112 includes a source code examination component 205, a globalization request analyzer 210, a globalization code generator 215, a verification component 220. The development operation information system manager 112 may also be associated with or include verification logs 225, a specification check list 230, one or more globalization enablement profiles 235, one or more source code templates 240, and a test case repository 245.

In one embodiment, the specification check list 230 for a given application project is a predefined (e.g., by a globalization architect or development operations manager) list of globalization enablement features that should be included with the application. The specification check list 230 may include a targeted market region, languages associated with that region that need to be translated for the targeted market region, business mode associated with the application (e.g., an information management application, enterprise financial management tool, social media application, etc.), and any cultural-dependent features (e.g., time and date formats, currency symbols, numerical conventions, etc.). Further, in one embodiment, a globalization enablement profile 235 for a particular application project is a configuration file that specifies parameters for corresponding globalization enablement features. For example, a globalization architect can add a configuration setting to enable or disable real-time examination of the source code. As another example, the globalization enablement profile 235 may specify partial enablement of certain globalization features, which allows for incremental enablement during the development process.

In one embodiment, the source code examination component 205 evaluates source code of an application project based on design documents associated with the source code and development settings. The source code examination component 205 does so to identify related translatability calls and other potential issues in the source code as pertaining to globalization enablement. For example, the source code examination component 205 may scan for hard-coded string literals in the source code and determines whether the strings should be replaced with calls to an appropriate API method. To do so, the source code examination component 205 may first identify a given hard-coded string literal in the code and evaluate one of the design documents associated with the application. Then, the source code examination component 205 may flag the hard-coded string literal for further review (e.g., by the globalization request analyzer 210). As another example, the source code examination component 205 may flag API calls to globalization enablement methods that are performed out of sequence.

In one embodiment, the globalization request analyzer 210 evaluates the source code relative to the specification check list 230 to determine whether the source code includes the globalization enablement APIs and translatability codes described in the specification check list 230. For example, if the specification check list 230 defines that the source code needs translatability functions, but the globalization request analyzer 210 cannot find an API call to a method for setting a locale in the application, the globalization request analyzer 210 may provide an indication to insert the proper method call to the source code at a proper location. The indication may include a description of a given issue detected in the source code, a line in the source code where the issue was detected, a recommendation of what code to replace or insert to the code.

In one embodiment, the globalization code generator 215 includes a set of modules for generating and inserting globalization-enabled source code based on the output of the source code examination component 205 and indications by the globalization request analyzer 210. To do so, the globalization code generator 215 may evaluate the indications to determine an action to perform on the source code. For example, if the globalization request analyzer 210 indicates a recommendation to display a translated message based on a detected hard-coded string literal, the globalization code generator 215 may extract the hard-coded string literal and store it in a translatability file (used as a parameter for a translatability API method call) and replace the hard-coded string literal with the translatability API method call. To provide the globalization code generator 215 with the correct call, the globalization code generator 215 may evaluate source code templates 240. In one embodiment, the source code templates 240 provide a set of globalization enablement sources used to solve different globalization requirements on different business modes. Such templates 240 can be in a variety of programming languages, such as Java, C++, pseudocode, etc. For instance, the source code templates 240, for areas of source code identified to be related to translatability of a usage status message in a user interface, may provide a sequence of calls, such as calls to a method for setting a region locale, opening a category descriptor, retrieving a category relating to usage, and closing the category descriptor. As another example, the globalization request analyzer 210 may indicate that a portion of the source code should include globalization enablement for currency formatting. A template 240 for such a case may include calls to a method for setting a locale and calling a monetary formatting method. The globalization code generator 215 may apply a corresponding source code template 240 to the developer source code.

In one embodiment, the source code templates 240 may be provided by a globalization template manager 250. Generally, the globalization template manager 250 maintains the source code templates 240 used to provide compliant globalization enablement source code tailored to a given project. In addition, the globalization template manager 250 may evaluate additional development projects in the software development environment. For example, the globalization template manager 250 may update the source code templates 240 based on templates and code used in other software development projects.

In one embodiment, the verification component 215 may generate a temporary build of the developer source code, e.g., prior to check-in of the source code to the repository. Further, the verification component 220 may execute the build against one or more of the verification test cases in the test case repository 245 to determine whether the new globalization-enabled source code performs as expected. In addition, the verification component 215 may evaluate updated source code after the globalization code generator 215 inserts globalization-enabled code therein. For example, the verification component 215 may evaluate a correct sequence of API method calls associated with translatability. Further still, the verification component 220 may record results of the verification tests to the verification logs 225.

Figure 3:
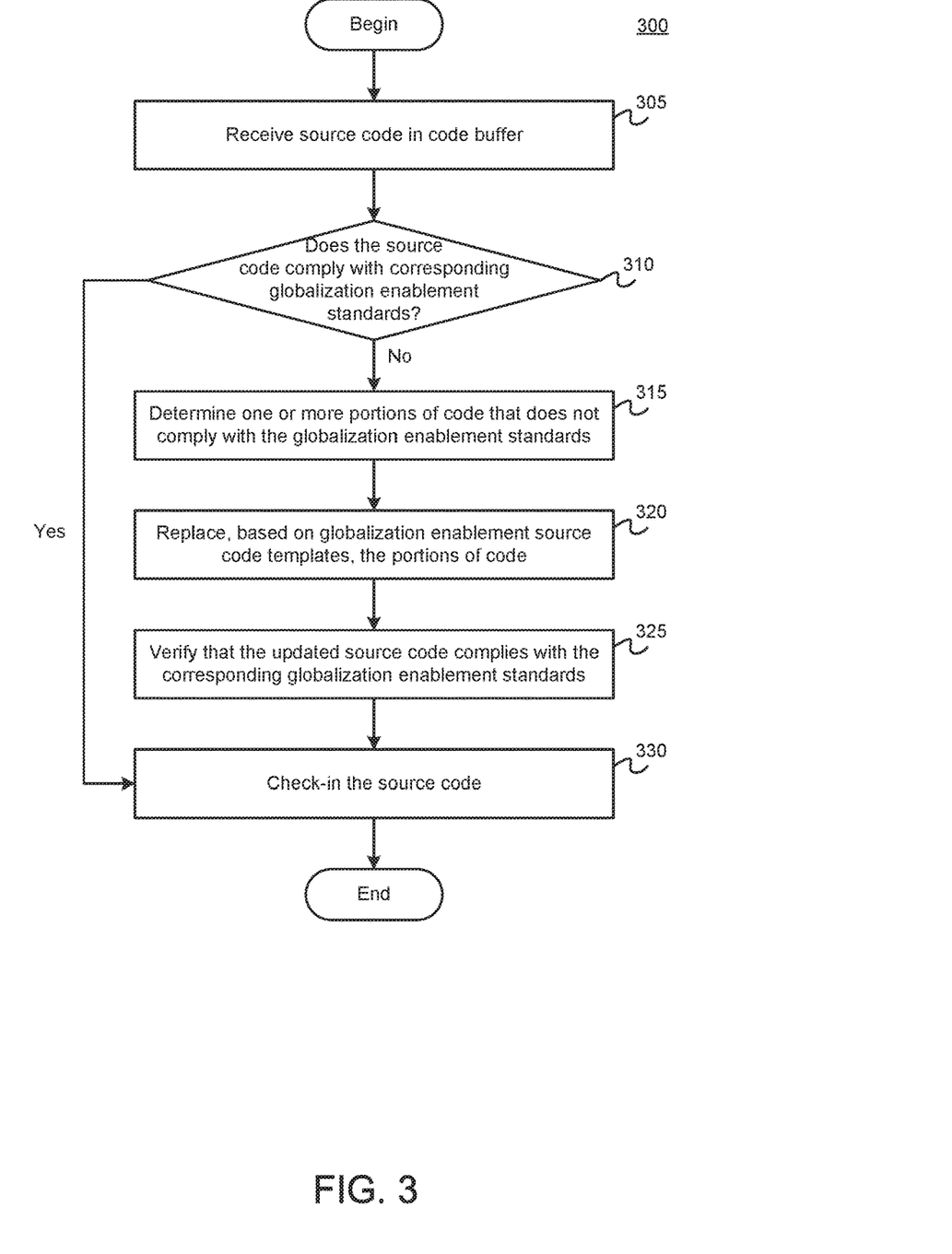
FIG. 3 illustrates a method for evaluating developer source code for globalization features, according to one embodiment.

FIG. 3 illustrates a method 300 for updating developer source code to comply with globalization enablement requirements (e.g., specified in the check list 230 associated with a given application project), according to one embodiment. In this example, assume that a developer completes writing source code for a given application project and requests to check-in the code to the repository. Of course, method 300 may be applicable in cases where the developer is writing code in real-time. As shown, method 300 begins at step 305, where the source code examination component 205 receives source code in a temporary code buffer. The source code examination component 205 may evaluate lines in the source code relative to design documents associated with the application project and the specification check list 230. Doing so allows the source code examination component 205 to identify potential issues with the source code relative to globalization enablement requirements specified in the specification check list 230, such as hard-coded string literals in the source code that should be replaced with translatability API calls.

At step 310, the globalization request analyzer 210 determines, based on the output of the source code examination component 205, whether the source code complies with globalization enablement standards specified for the application. If so, then at step 330, the development operations information system manager 112 checks in the code to the repository.

Otherwise, at step 315, the globalization request analyzer 210 determines one or more portions of the code that does not comply with the globalization enablement standards. To do so, the globalization request analyzer 210 identifies the predefined requirements (from the specification check list 230) that are deficient in the source code. For example, if the specification check list 230 specifies that the application should include globalization features for translatability but the source code itself does not include any calls to a method that sets a locale for the application, the globalization request analyzer 210 may generate an indication that includes a recommendation to insert that call in the source code. The indication may also recommend a location in the source code in which to place the API method call.

At step 320, the globalization code generator 215 replaces identified portions of the code with globalization-enabled source code. To do so, the globalization code generator 215 may evaluate indications received by the globalization request analyzer 210 relative to source code templates 240. This step is explained in further detail relative to FIG. 4.

At step 325, the verification component 220 evaluates the source code to determine that the source code complies with the globalization enablement standards. To do so, the verification component 220 may generate a temporary build of the source code on a server. The verification component 220 may then perform one or more test cases maintained in the test case repository 245. An example test case determines whether messages output to the application, set for a given region, correspond to an expected message. The test case may fail if one of the messages differs from the expected message (e.g., this may be because the message corresponds to a hard-coded string literal that was written in a native language of the developer). If the verification component 220 identifies any errors, the verification component 220 may send such results to the globalization request analyzer 210. In turn, the globalization request analyzer 210 may evaluate the results and send an indication to the globalization code generator 215 describing the issues.

At step 330, after determining that the developer source code complies with the globalization enablement standards described in the associated specification check list 230 and globalization enablement profile 235, the development operation information system manager 112 checks the code in to the repository.

Figure 4:
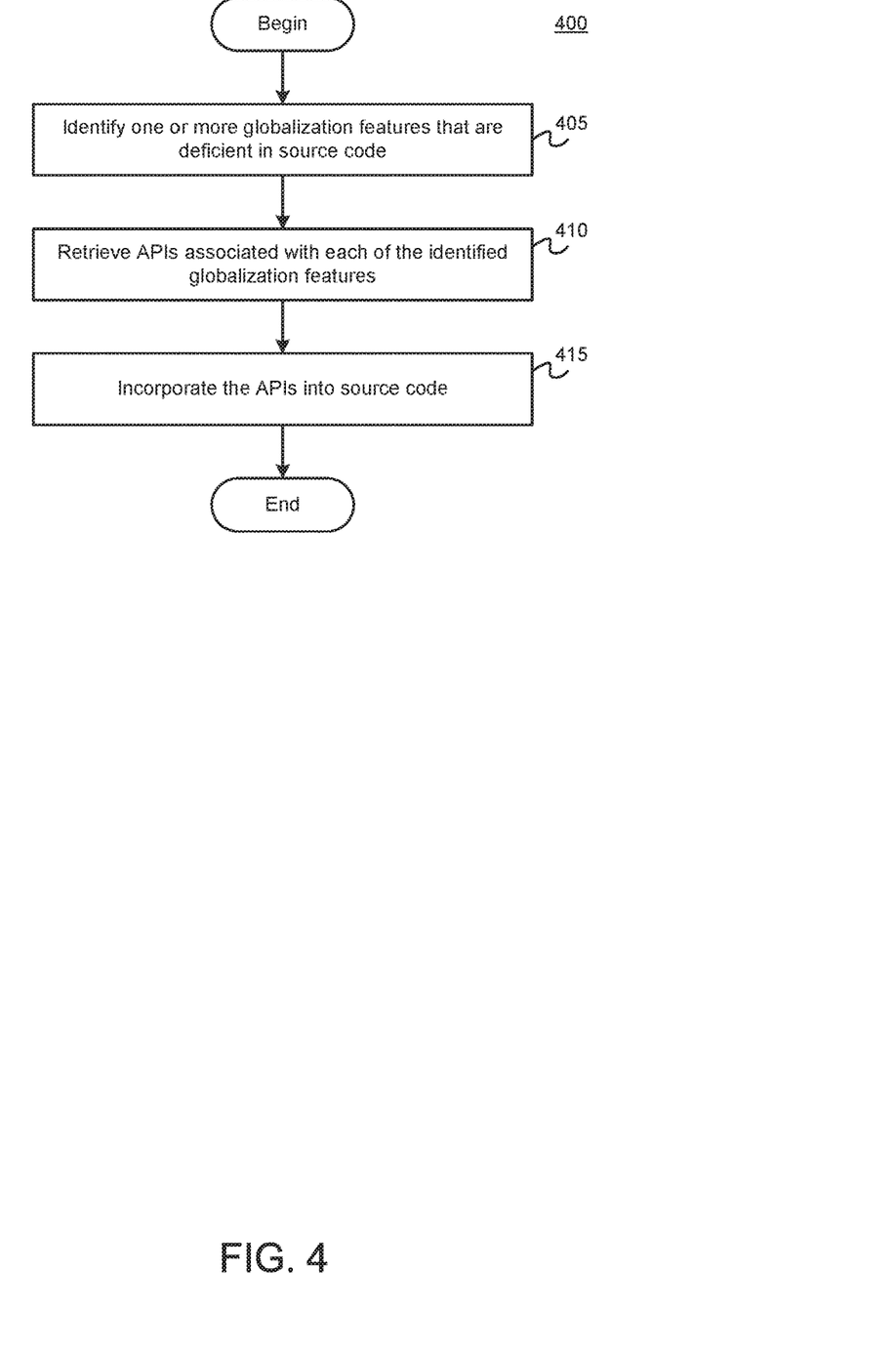
FIG. 4 illustrates a method for formatting developer source code to conform to globalization enablement standards, account to one embodiment.

FIG. 4 illustrates a method 400 for formatting developer source code to conform to globalization enablement standards, according to one embodiment. As stated, the source code examiner 205 and the globalization request analyzer 210 may detect potential issues in developer source code regarding compliance to specified globalization enablement standards. The globalization request analyzer 210 generates an indication for each area in the source code that is deficient with regard to globalization enablement (e.g., due to a hard-coded string literal, missing API calls, etc.). The globalization request analyzer 210 may the send the indication to the globalization code generator 215.

As shown, method 400 begins at step 405, where the globalization code generator 215 identifies, based on the indications send by the globalization request analyzer 210, one or more globalization features that are deficient in the developer source code. The globalization code generator 215 parses the indications to identify missing globalization features. For example, the globalization code generator 215 may identify that an API call to set a locale within the source code is missing. The globalization code generator 215 may also identify that a currency formatting API is missing.

At step 410, the globalization code generator 215 retrieves APIs associated with each of the identified globalization features. To do so, the globalization code generator 215 evaluates the source code templates 240 relative to the indications received by the globalization request analyzer 210.

At step 415, the globalization code generator 215 incorporates the APIs into the source code. In particular, the globalization code generator 215 may retrieve a corresponding template and apply the template to the source code. For example, the template may specify that the globalization code generator 215 extract a hard-coded string literal from the source code and store that string in a key-value structure listing translatability terms, saved in a directory corresponding to given locale. The globalization code generator 215 may pass the stored string to a translation server for translation into regional languages contemplated for application users in other countries. The template may also include source code corresponding to a translatability method call. The globalization code generator 215 may insert the call into the source code, using the stored string as a parameter.

Figure 5:
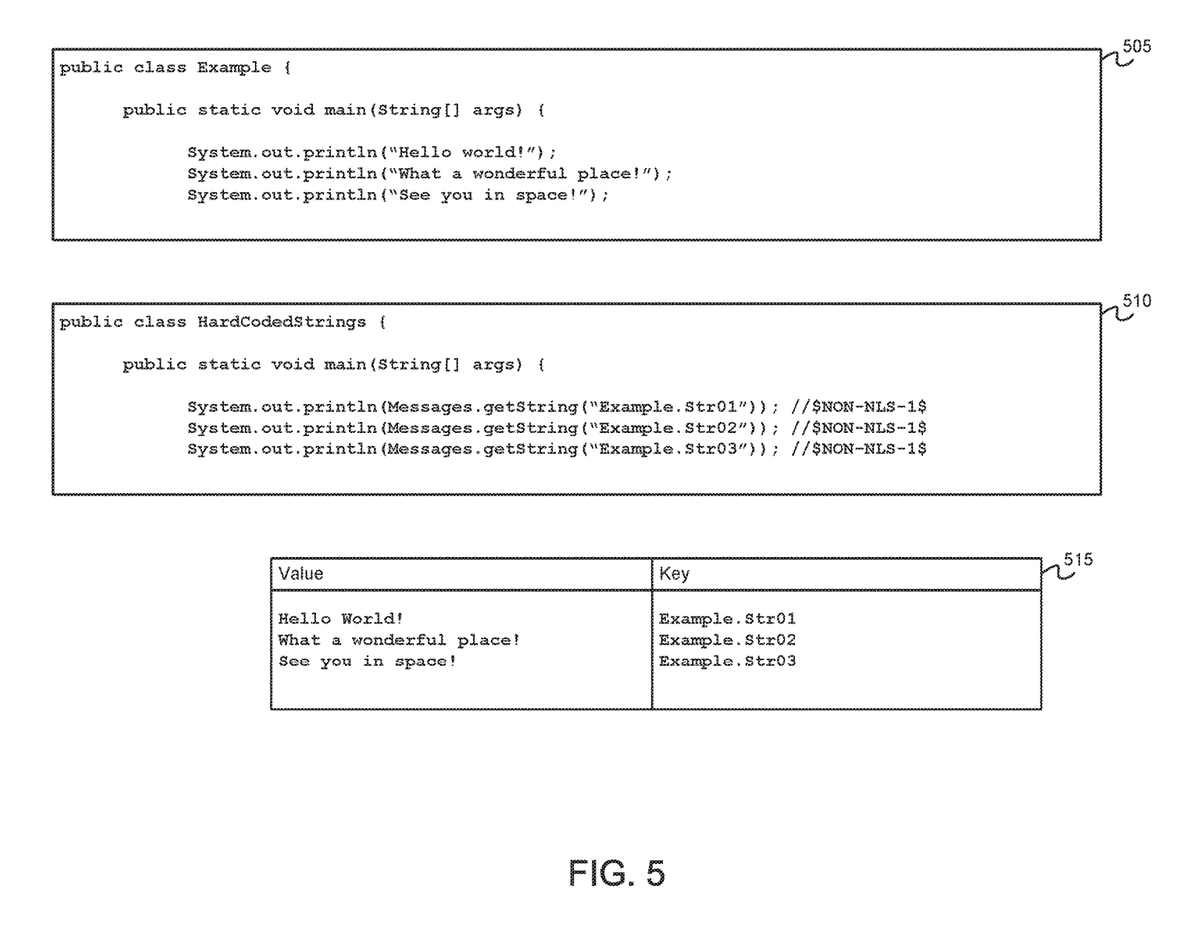
FIG. 5 illustrates an example of converting hard-coded messages in developer source code to conform with globalization enablement standards, according to one embodiment.

FIG. 5 illustrates an example of converting hard-coded messages in developer source code to conform with specified globalization enablement standards, according to one embodiment. In particular, FIG. 5 depicts example developer source code for a given application. For instance, item 505 illustrates source code defining an "Example" class. Within the example class are calls to a print method to display some text as output. In this example, the developer source code includes hard-coded string literals in English as parameters to each print method call: "Hello world!", "What a wonderful place!", and "See you in space!". Such strings may be problematic in the event that the underlying application is adapted to non-English-speaking countries. Indeed, a specification check list 230 associated with the underlying application may specify translatability requirements for the application.

In this example, the source code examination component 205 and the globalization request analyzer 210 may detect the hard-coded string literals. Further, the globalization request analyzer 210 may send an indication of the hard-coded string literals to the globalization code generator 215. The indication may recommend replacing the hard-coded string literals with translatability API method calls. In response, the globalization code generator 215 evaluates the indication with the source code templates 240. The globalization code generator 215 may identify and retrieve a translatability API that provides a Messages class that includes a getString method, which retrieves a string from a specified text file. Once retrieved, the globalization code generator 215 may extract the hard-coded string literals from the source code and store the strings in a key-value store (at 515). Thereafter, the globalization code generator 215 may replace the hard-coded string literals in the source code with API calls for retrieving the corresponding text from the key-value store (at 510). The resulting source code at 515 complies with the specified globalization enablement requirements.

Figure 6:
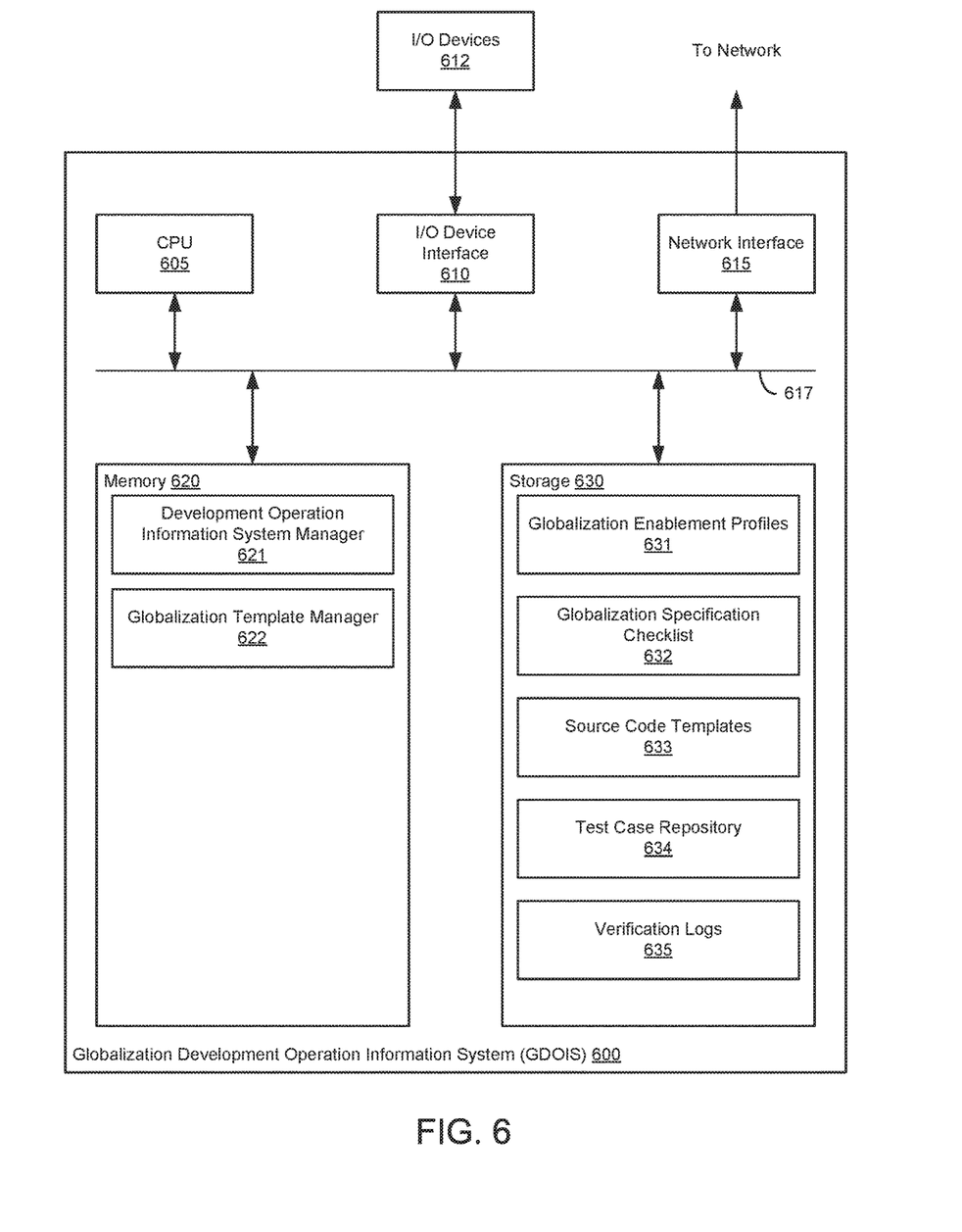
FIG. 6 illustrates an example computing system configured to provide globalization enablement, according to one embodiment.

FIG. 6 illustrates an example globalization development operation information system (GDOIS) 600, according to one embodiment. As shown, the GDOIS 600 includes, without limitation, a central processing unit (CPU) 605, a network interface 615, a memory 620, and storage 630, each connected to a bus 617. The GDOIS 600 may also include an I/O device interface 610 connecting I/O devices 612 (e.g., keyboard, display, mouse devices, etc.) to the GDOIS 600. Further, in context of the present disclosure, the computing elements shown in the GDOIS 600 may correspond to a physical computing system (e.g., a system in an enterprise network) or a virtual computing instance.

CPU 605 retrieves and executes programming instructions stored in memory 620 as well as stores and retrieves application data residing in the storage 630. The bus 617 is used to transmit programming instructions and application data between CPU 605, I/O devices interface 610, storage 630, network interface 615, and memory 620. Note, CPU 605 is included to be representative of a single CPU, multiple CPUs, a single CPU having multiple processing cores, and the like. Memory 620 is generally included to be representative of a random access memory. Storage 630 may be a disk drive storage device. Although shown as a single unit, storage 630 may be a combination of fixed and/or removable storage devices, such as fixed disc drives, removable memory cards, or optical storage, network attached storage (NAS), or a storage area-network (SAN).

Illustratively, memory 620 includes a development operation information system manager 621 and a globalization template manager 622. And storage 630 includes globalization enablement profiles 631, a globalization specification check list 632, source code templates 633, a test case repository 634, and verification logs 635. The development operation information system manager 621 provides a user interface for managing development operations, such as activities on high-level and low-level design, code, and verification tests.

In one embodiment, the development operation information system manager 621 may evaluate developer source code (e.g., via globalization enablement daemon processes executing on a developer system) for a given application project to determine whether the developer source code complies with globalization enablement profiles 631 and the globalization specification check list 632 associated with the application project. If issues relating to globalization enablement are identified in the source code (e.g., hard-coded string literals, misplaced or missing globalization enablement API calls, etc.), the manager 621 may insert (and/or replace) source code identified in the source code templates 633 such that the source code complies with the requirements. The manager 621 may perform these actions in real-time (e.g., using source code saved to a temporary buffer) or prior to a developer checking-in source code to a repository.

Further, in one embodiment, the manager 621 may verify the operability of the globally-enabled code inserted in developer source code using test cases from the test case repository 634 on a temporary build of the application project. In addition, the manager 621 may perform logical analysis of the source code (without having to create a temporary build of the code) to determine whether the code makes proper calls to globalization enablement APIs. In addition, the GDOIS may determine whether necessary files in the application project, e.g., language files and sub-directories associated with targeted regions are present. In one example, the verification might fail if a translation file associated with a given target region is missing. The manager 621 may record the results of the test cases to the verification logs 635.

In one embodiment, the globalization template manager 622 maintains the source code templates 833 used to provide compliant globalization enablement source code tailored to a given project. In addition, the globalization template manager 622 may periodically update the source code templates 622 based on template sources, such as other application projects in the software development environment. The globalization template manager 622 validates results output from the template sources, and once validated, the globalization template manager 622 updates the source code templates 633 with new, corrected, or additional source code.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, any reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications (e.g., the development operation information system manager) or related data available in the cloud. For example, the development operation information system manager could execute on a computing system in the cloud and evaluate developer source code against globalization enablement requirements set by a globalization architect of an enterprise network. In such a case, the development operation information system manager could detect deficiencies in developer source code with respect to globalization enablement source code and correct the deficiencies identified in the source code. Further, the development operation information could store verification test result logs at a storage location in the cloud. Doing so allows a user to access this information from any computing system attached to a network connected to the cloud (e.g., the Internet).

While the foregoing is directed to embodiments of the present disclosure, other and further embodiments of the present disclosure may be devised without departing from the basic scope thereof, and the scope thereof is determined by the claims that follow.

What is claimed is:

1. A method for providing one or more globalization enablement features to an application, comprising:
evaluating source code of an application based on one or more globalization enablement requirements;
identifying a first portion of the source code that is not compliant with a first globalization enablement requirement, based on determining that the first portion of the source code includes a string literal that is hard-coded into the source code;
replacing the identified first portion of the source code by removing the string literal that is hard-coded and inserting replacement source code that is compliant with the first globalization enablement requirement, wherein the replacement source code is generated based on a first source code template;
identifying a second portion of the source code that is not compliant with a second globalization enablement requirement, based on determining that the second portion of the source code does not include a function to format currency during runtime of the application;
inserting a currency format function into the second portion of the source code, based on a second source code template;
identifying a third portion of the source code that is not compliant with a third globalization enablement requirement, based on determining that the third portion of the source code does not include a function to format date and time settings during runtime of the application;
inserting a date format function into the third portion of the source code, based on a third source code template;
prior to checking the source code into a repository, generating a temporary build of the application, wherein generating the temporary build does not fully compile the source code into a binary executable;
executing the temporary build in a test environment to validate the source code, wherein executing the temporary build in a test environment to validate the source code comprises verifying that the identified first, second, and third portions of the source code of the application are compliant with the at least one of the globalization enablement requirements; and
upon successfully validating the source code, checking-in the source code into the repository.

2. The method of claim 1, wherein the replacement source code includes a call to a corresponding application programming interface (API), wherein the corresponding API translates an underlying text of the string literal based on a region setting of the application.

3. The method of claim 1, further comprising:
updating source code compliant with the first globalization enablement requirements based on at least a plurality of globalization development projects.

4. The method of claim 1, further comprising:
evaluating, based on the one or more globalization enablement requirements, an order of API calls of a globalization feature in the source code.

5. The method of claim 4, further comprising:
detecting an incorrect order of the API calls of a globalization feature based on the one or more globalization enablement requirements; and
reordering the API calls to comply with the one or more globalization enablement requirements.

6. The method of claim 2, wherein removing the string literal comprises storing underlying text of the string literal in a key-value store, and wherein translating an underlying text of the string literal comprises retrieving the underlying text from the key-value store.

7. The method of claim 1, wherein verifying that the identified first, second, and third portions of the source code of the application are compliant comprises using a plurality of test cases for the globalization enablement requirements.

* * * * *